(No Model.)

J. W. WATTS.
FERTILIZER SOWER.

No. 308,585. Patented Nov. 25, 1884.

Witnesses:
C. Fred. Heller.
C. H. Rauder.

Inventor:
John W. Watts,
By Parker H. Sweet Jr.
Atty.

United States Patent Office.

JOHN W. WATTS, OF PORTSMOUTH, ASSIGNOR OF ONE-HALF TO ORLANDO L. BAKER, OF PROVIDENCE, RHODE ISLAND.

FERTILIZER-SOWER.

SPECIFICATION forming part of Letters Patent No. 308,585, dated November 25, 1884.

Application filed March 27, 1884. (No model.)

*To all whom it may concern:*

Be it known that I, JOHN W. WATTS, a citizen of the United States, residing at Portsmouth, in the county of Newport and State of Rhode Island, have invented certain new and useful Improvements in Fertilizer-Sowers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has for its object to provide an improved apparatus for distributing fertilizers in furrows or drills preparatory to planting potatoes or other vegetables and seeds; and it consists in the construction and arrangement of parts, as will be hereinafter described, and particularly pointed out in the claim.

Figure 1:
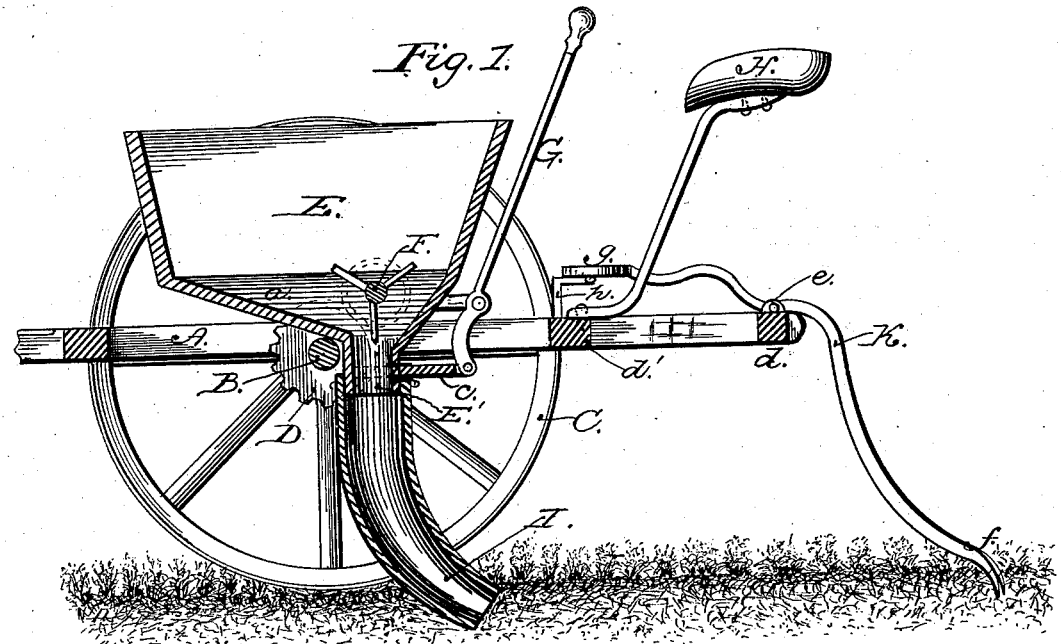
Figure 2:
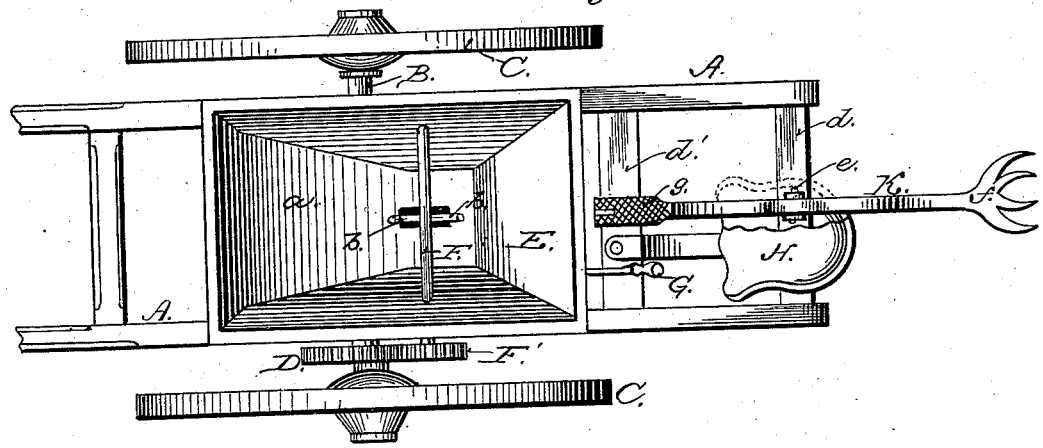

In the accompanying drawings, Figure 1 represents a vertical longitudinal section of my improved apparatus, and Fig. 2 a top plan view thereof.

Similar letters of reference indicate like parts in both figures.

Referring to the drawings, A represents the supporting-frame and shafts which are mounted upon the axle B, carrying the vehicle-wheels C, as shown.

Upon the inside rim of the hub of one of the vehicle-wheels is secured a suitable cog-wheel, D, while directly over the axle B, and mounted on the frame A, is provided a hopper, E, having an inclined bottom, a, as fully shown in Fig. 1, and through the lower portion of which passes a shaft, F, on a line parallel to that of the axle B. Upon the outside end of said shaft F is attached a cog-wheel, F', which meshes with the cog-wheel D upon the vehicle-wheel C, while upon the central portion of said shaft F is attached a suitable number of stirring blades or pins, $b$, which are located directly over the central hole in the bottom of the hopper which leads to the distributing-spout E'. A suitable valve, slide, or cut-off, $c$, is arranged in the upper part of the said spout E', and is adapted to be moved in and out by the pivoted hand-lever G, which projects above the machine, so as to be readily grasped by the hand of the operator, a suitable spring-seat, H, being provided at the rear of the hopper E, as shown. A canvas or rubber tube, I, is attached to the bottom of the distributing-spout E', and is of such a length that it will trail back a short distance in the furrow or drill.

To the rear cross-beam, $d$, of the frame A is pivoted, by means of the bolt $e$, a rake, K, of novel construction, the bar or handle of which is of a curved shape, while the raking-fingers $f$ are somewhat of a claw shape, so as to thoroughly pulverize the earth and fertilizer together in the furrow. The upper end of the bar or handle of the said rake K is provided with a foot-piece, $g$, to enable the operator to raise or lower the raking mechanism at pleasure.

Upon the cross-beam $d'$ of the frame A, immediately in the rear of the hopper E, is provided a lug or catch, $h$, with which the foot-piece $g$ is engaged when it is desired to hold the rake up from the ground.

The construction of my invention being as described, it will be observed that in the operation of the same the hopper E is filled with the fertilizer, and the apparatus drawn along over the furrow or drill, which has been made by an ordinary furrow-opener, with the flexible tube I trailing back a short distance in said furrow. By drawing the slide $c$ outwardly the fertilizer passes down the distributing-spout E', through the tube I, and is evenly distributed in the bottom of the furrow, the inclined bottom of the hopper causing the fertilizer to naturally gravitate to the discharge-opening, and the blades or pins $b$ upon the revolving shaft F serving to keep the fertilizer in a loose condition, free from packing, and easy of discharge in the proper quantity. The pivoted raking-fork, following at a close distance back of the discharge-opening of the tube I, immediately covers or mixes the fertilizer with a sufficient quantity of loose soil to prevent the fertilizer from being blown away or distributed unevenly in the furrow.

By means of my improvements a most simple, inexpensive, and efficient apparatus is produced, one which may be drawn by hand or by horse-power, according to the nature of the work to be accomplished, and which obviates the uneven distribution of the fertilizer common to machines heretofore employed for the same purpose.

Having thus described my invention, what I claim as new and useful is—

In a fertilizer-sower, the combination, with the frame, hopper, axle-bearing wheels, and shaft F, provided with pins $b$, and cog-wheels D and F', of the lever G, the distributing-spout having the flexible trailing tube, and the rake-bar K, pivoted to the rear of the frame, and provided at one end with the foot-piece $g$, and at the other end with claw-teeth $f$, said foot-piece adapted to engage the catch $h$, as shown and described.

In testimony whereof I affix my signature in presence of two witnesses.

JOHN W. WATTS.

Witnesses:
HARMON S. BABCOCK,
JAMES W. WILLIAMS.